United States Patent
Tounissou et al.

[11] Patent Number: 6,113,796
[45] Date of Patent: Sep. 5, 2000

[54] METHOD FOR SEPARATING METALS BY MICELLAR ULTRAFILTRATION THAT CAN BE USED TO PROCESS RADIOACTIVE WASTE

[75] Inventors: Philippe Tounissou, Nancy; Marc Hebrant, Villers-les-Nancy; Ludwig Rodehüser, Ludres; Christian Tondre, Vandoeuvre-les-Nancy, all of France

[73] Assignee: Compagnie Generale des Matieres Nucleaires, Velizy-Villacoublay, France

[21] Appl. No.: 09/212,449

[22] Filed: Dec. 16, 1998

[30] Foreign Application Priority Data

Dec. 23, 1997 [FR] France ................................ 97 16358

[51] Int. Cl.$^7$ .................................................. B01D 61/00
[52] U.S. Cl. ..................... 210/651; 210/638; 210/650; 423/2
[58] Field of Search .................... 210/638, 651, 210/650; 423/2

[56] References Cited

U.S. PATENT DOCUMENTS

| | | | |
|---|---|---|---|
| 4,014,787 | 3/1977 | Shorr | 210/651 |
| 5,525,232 | 6/1996 | Veiro et al. | 210/638 |
| 5,766,478 | 6/1998 | Smith et al. | 210/638 |

FOREIGN PATENT DOCUMENTS 2619727  3/1989  France.

*Primary Examiner*—Ana Fortuna
*Attorney, Agent, or Firm*—Pearne & Gordon LLP

[57] ABSTRACT

The present invention relates to a method for separating metals by micellar ultrafiltration, that can be used to process radioactive waste.

This process consists of adding to the aqueous solution a complexing anionic surfactant having the formula:

$$M^+\text{---OOC---}(CH_2)_{\overline{m}}\text{---}\underset{\underset{\text{R}}{\overset{|}{\text{NH---CO---R}}}}{\text{CH}}\text{---COO---}M^+ \quad (I)$$

$M^+$ = cation, for example $NA^+$
m = 1 or 2
R = aliphatic group of at least eight carbon atoms, and optionally a nonionic surfactant such as Triton X-100 or Brij 35 to produce micelles (10) in the solution, and subsequently of filtering the solution through an ultrafiltration membrane (3) to retain the previously formed micelles.

19 Claims, 1 Drawing Sheet

METHOD FOR SEPARATING METALS BY MICELLAR ULTRAFILTRATION THAT CAN BE USED TO PROCESS RADIOACTIVE WASTE

TECHNICAL FIELD

The present invention relates to a method for separating metals present in an aqueous solution, that can be used in particular to process radioactive waste.

It applies to the separation of metals chosen from among thorium, uranium, ruthenium, and transuranics, in particular their separation from aqueous solutions having a high concentration of salts such as nitrates.

More precisely, it concerns separation by micellar ultrafiltration, that is to say after the addition of organic compounds to the aqueous solution that are able to complex the metals and form micelles of sufficiently large size that they can be withheld by an ultrafiltration membrane.

STATE OF THE PRIOR ART

Two methods for separating metal ions are known using micellar ultrafiltration.

Under the first method, complexing of the metal by the micelle is made by electrostatic attraction, the metal species being adsorbed in relation to their affinity on the surface of the micelle. In this case, the micelle is made up of an anionic surfactant compound if the metal ion is a cation, or of a cationic surfactant compound if the metal ion is in anion form.

Under the second method, the metal species are complexed with a ligand solubilized in the hydrophobic core of the micelle made up of a surfactant. In this case, it is required to add to the solution both a surfactant compound and a ligand complexing the metal to be extracted.

The separation of the uranyl ion $UO_2^{2+}$ by micellar ultrafiltration in accordance with the first method is described for example by Reiller et al in *Journal of Colloid and Interface Science*, 163, 1994, pages 81–86 [1]. Under this method micelles of sodium dodecyl- or tetradecylsulfate are formed in the aqueous solution containing the uranium, and the solution is subsequently subjected to ultrafiltration through a membrane with a cut-off threshold of 10 000 daltons to retain the uranium and obtain a purified aqueous solution. In this way more than 99% of uranium can be removed.

Document FR-A-2 619 727 [2] also describes the separation of metal ions using the first method of micellar ultrafiltration. In this case, surfactant detergents are added to the solution such as sodium dodecyl sulfate, cetyltrimethylammonium bromide, and sodium didocyldiethylene triamine triacetate, the latter possibly also acting as complexer, to separate metal ions such as Cu (II) and Cr (III) with yields of over 99%.

The second method using the simultaneous presence of surfactants and ligands is described for example by Pramauro et al in *Analytica Chimica Acta*, 264, 1992, pages 303–310 ([3] and in *Colloids and Surfaces*, 63, 1992, pages 291–300 [4].

In reference [3] the second method is used to separate uranyl ions by adding to the aqueous solution surfactant agents and a ligand made up of two phenalanine terminals connected by an ether chain. Improved efficacy is obtained by adding in addition a second hydrophobic ligand made up of the oxide of trioctylphosphine.

In reference [4] the iron is separated from aqueous solutions using amphiphilic ligands derived from 4-aminosalicylic acid, and nonionic surfactants of polyoxyethylene dodecyl ether type.

With this method a separation efficiency of more than 99% can be obtained, but the operation must be conducted at a pH of 3.5–4.0.

The methods described above can achieve satisfactory separation of various metals from solutions with low salt content, but some surfactants and ligands used in these methods are not suitable for the removal of metals from solutions having a high nitrate content such as those produced by plants which reprocess waste nuclear fuel, which may for example contain 3 mol/l of nitrates, owing to their low solubility in these solutions.

DISCLOSURE OF THE INVENTION

The purpose of the present invention is preciously a method for separating at least one metal present in an aqueous solution, which can achieve high separation levels with solutions having a high nitrate content.

According to the invention, the method comprises the following stages:

1) adding to the aqueous solution a complexing anionic surfactant having the formula:

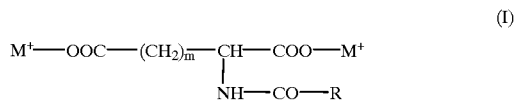

(I)

in which $M^+$ represents a monovalent cation, m equals one or two, and R represents a linear or branched, saturated or unsaturated aliphatic group of at least eight carbon atoms, in sufficient quantity for micelles to be formed in the solution, and 2) subsequently filtering the aqueous solution through an ultrafiltration membrane able to retain the previously formed micelles.

Preferably, to implement the method of the invention, a nonionic surfactant is also added to the aqueous solution to solubilize the anionic surfactant of formula (I) and obtain a stable system.

In the presence of a high nitrate concentration, 0.1 to 3 mol/l of nitrates for example, it is difficult to obtain a stable system with the surfactant of formula (I).

The nonionic surfactants which may be added can be of different type. Derivatives of polyoxyethylene glycol may be used for example, such as the products that are commercially available under the names Triton X-100 (polydispersed commercial preparation of p(1,1,3,3-tetramethylbutyl) phenoxy polyoxyethylene glycols containing an average of 9.5 oxyethylene groups per molecule) and Brij 35 which is a lauryl ether of polyoxyethylene having the formula:

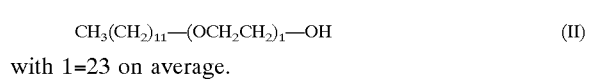

(II)

with l=23 on average.

Triton X-100 meets the formula:

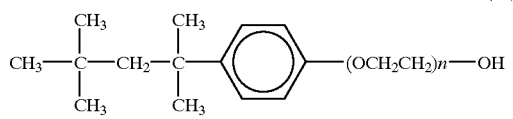

with n=9.5 on average.

According to the invention, the complexing anionic surfactant of formula (I) is a derivative of aminated diacid which has two carboxylic functions able to complex the metals to be separated. Preferably, in formula (I) given above m equals 2, the compound is therefore a derivative of glutamic acid.

In the surfactant of formula (I) the R group has at least 8 carbon atoms, preferably 10 to 30 carbon atoms. The monovalent cation $M^+$ may be an alkali metal or an ammonium cation.

Good results can be obtained with the derivative in which R represents the group $—(CH_2)_{16}–CH_3$ and m=2, using this derivative in the form of its sodium salt ($M^+=Na^+$). This derivative has a molar mass of 457 grams and a critical micellar concentration of $4.5 10^{-3}$ mol/l which may be lowered in the presence of high salt concentrations.

It is specified that critical micellar concentration is the concentration level at which aggregates start forming, called micelles, made up of 50 to 150 monomers.

Preferably, according to the invention, the complexing anionic surfactant of formula (I) is associated with a non-ionic surfactant made up of the lauryl ether of polyoxyethyleneglycol of formula (II) which comprises 23 oxyethylene members, has a molar mass of 1 199.57 g and a critical micellar concentration of $10^{-5}$ mol/l.

For the implementation of the method of the invention, the complexing anionic surfactant and optionally the non-ionic surfactant are first added to the aqueous solution to be treated, then the solution is filtered through an ultrafiltration membrane chosen such that it retains the micelles formed in the aqueous solution.

When a nonionic surfactant is used, this nonionic surfactant is preferably added to the solution before adding the complexing anionic surfactant.

The quantities of surfactants added are such that micelles are formed in the solution. For the complexing anionic surfactant of formula (I), concentrations ranging from $4.10^{-4}$ to $5.10^{-2}$ mol/l can be used, preferably concentrations of $10^{-3}$ to $10^{-2}$ mol/l.

The concentrations of nonionic surfactant are chosen so as to obtain a stable system. For example $5.10^{-3}$ to $4.10^{-2}$ mol/l, preferably $10^{-2}$ to $2.10^{-2}$ mol/l, of nonionic surfactant can be used.

To conduct subsequent ultrafiltration, an organic or mineral ultrafiltration membrane may be used.

As an example of mineral membrane, mention may be made of alumina support membranes comprising a filtering surface in zirconium/titanium oxide, and carbon support membranes comprising a filtering surface in zirconium/titanium oxide.

As an example of organic membrane, mention may be made of membranes in regenerated cellulose.

Ultrafiltration may be front flow ultrafiltration, that is to say the liquid is caused to circulate perpendicular to the ultrafiltration membrane, or tangential flow ultrafiltration may be used in which hollow membranes are used and the solution is caused to circulate parallel to the surface of the hollow membrane.

Tangential flow ultrafiltration is preferred as it offers the following advantages.

Fouling of the membrane and formation of the polarisation layer can be limited with tangential flow, which can improve flow rates compared with front flow ultrafiltration.

When mineral membranes are used, good heat resistance is obtained (up to 380° C.) and good chemical resistance for pH values ranging from 1 to 14.

Improved control over selectivity is achieved by acting upon operating conditions.

The only energy required is that used to operate the circulation pump.

The cut-off threshold of the ultrafiltration membrane used is chosen such that it promotes good micelle retention and avoids high surfactant losses in the filtrate, without however greatly reducing ultrafiltration flow. For example ultrafiltration membranes can be used having a cut-off threshold of 5000 to 30 000 daltons.

For front flow ultrafiltration, advantageously a membrane is used having a cut-off threshold of approximately 10 000 daltons.

For tangential flow ultrafiltration, membranes having a cut-off threshold of 10 000 to 15 000 daltons are preferred.

The method of the invention is easy to implement for industrial applications, especially for the processing of radioactive waste.

It is particularly suitable for removing thorium, uranium, plutonium, ruthenium and transuranics from radioactive waste containing approximately 3 mol/l of nitrates, such as those derived for example from rinsing of equipment in plants which process irradiated nuclear fuel.

Other metals such as transition metals may also be separated with this method.

Other characteristics and advantages of the invention will become clearer on reading the following examples which, needless to say, are given for guidance purposes and are not restrictive, with reference to the appended drawings.

SHORT DESCRIPTION OF THE DRAWINGS

DETAILED DESCRIPTION OF THE EMBODIMENTS

Figure 1:
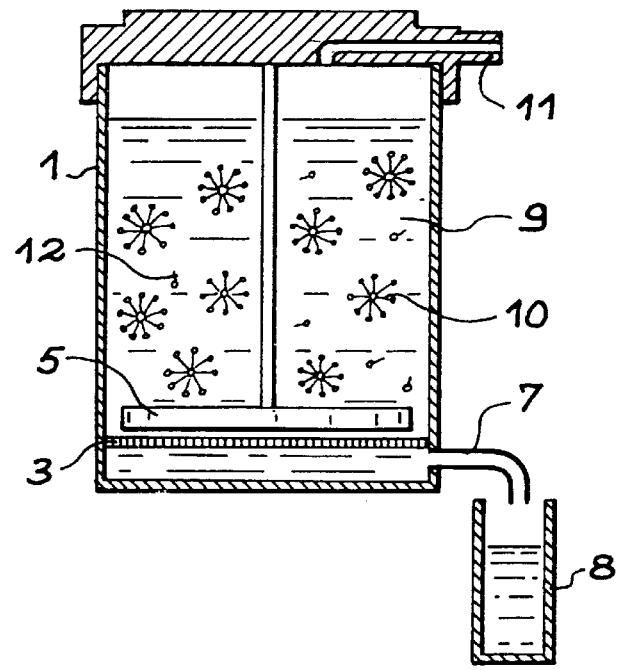
FIG. 1 is a vertical section diagram of a front flow micellar ultrafiltration installation.

FIG. 1 gives a vertical section diagram of a front flow micellar ultrafiltration installation. This installation comprises a cell 1 equipped with an ultrafiltration membrane 3 and a magnetic stirrer 5 positioned at membrane level. The filtered liquid may be evacuated through outlet duct 7, being collected in container 8, and nitrogen pressure may be applied above liquid 9 present in the cell via a nitrogen inlet duct 11. In the figure it can be seen that liquid 9 comprises micelles 10 on which are adsorbed the metals to be separated, and free surfactant 12.

In the following examples 1 to 9, an installation of this type was used to separate thorium, uranium and ruthenium from aqueous solutions. In these examples, the volume of the cell is 200 ml, and membrane 3 is a regenerated cellulose membrane whose cut-off threshold is 10 000 daltons (Millipore membrane) having a filtering surface of 28.7 cm². In cell 1 a nitrogen pressure of 0.35 Mpa is applied via duct 11.

EXAMPLES 1 to 3

In these examples, this installation was used to separate thorium, uranium, and ruthenium from aqueous solutions having a pH of 10, a sodium nitrate concentration of 3 mol/l and the Th, U and Ri contents given in table I, after adding to them an anionic surfactant made up of HS-21 and a nonionic surfactant made up of Triton X-100, the HS-21 and Triton X-100 levels being those also given in table 1.

The anionic surfactant HS-21 meets the following formula:

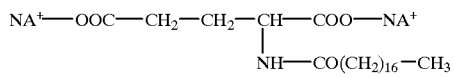

Triton X-100 meets the formula:

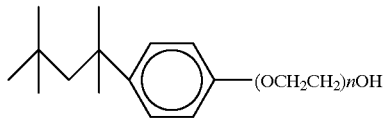

with n representing on average 9.5

After addition of the surfactants and stirring until a clear solution is obtained, the pH is adjusted to 10 through the addition of NaOH.

Ultrafiltration is then carried out operating at a temperature of 20° C. and filtering 50% of the solution. The metals are then titrated in the retentate and the filtrate or permeate by ICP-MS (Plasma Torch coupled to a mass spectrometer). On the basis of these titrations, the extraction yield R is determined calculated as follows:

$$R(\%) = [1 - (Conc._{permeate}/Conc._{initial})] \times 100$$

in which $Conc._{permeate}$ represents the metal concentration of the permeate and $Conc._{initial}$ represents the metal concentration in the initial solution.

The results obtained are given in table I which gives the metal concentrations in the permeate after filtration of 50 ml and filtration of a further 50 ml.

EXAMPLE 4

In this example, the same operating mode is followed as in examples 1 to 3 to filter an aqueous solution whose composition is identical to that of example 3. Ultrafiltration is conducted such that 95% of the aqueous solution is filtered. The results obtained are give in table 2.

EXAMPLES 5 to 7

In these examples, the same operating mode is followed as in examples 1 to 3 to separate thorium, uranium, and ruthenium from aqueous solutions having the compositions given in table 3, but using Brij 35 as nonionic surfactant which is a lauryl ether of polyoxyethylene having the formula:

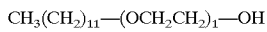

with l=23 on average, instead of Triton X-100.
The results obtained are given in table 3.

EXAMPLES 8 and 9

In these examples, the same operating mode is followed as in example 4 to filter aqueous solutions having the compositions given in tables 4 and 5 using Brij 35 instead of Triton X-100 as in examples 5 to 7. The results are given in tables 4 and 5.

Tables 1 to 5 show that good extraction results are obtained. However, in the case of Triton X-100, solubility problems may arise if the metal concentration is too high. When Brij 35 is used as nonionic surfactant instead of Triton X-100 (tables 3 to 5), the solutions are much more stable and excellent results are achieved both in respect of solubility and in respect of metal extraction yield.

Also, a study conducted in relation to the pH of the aqueous solution, showed that these yields are the same for pH values of between 6 and 10.

For ruthenium, tables 1 to 5 show that good yields are achieved for the extraction of ruthenium in the presence of other metals.

Figure 2:
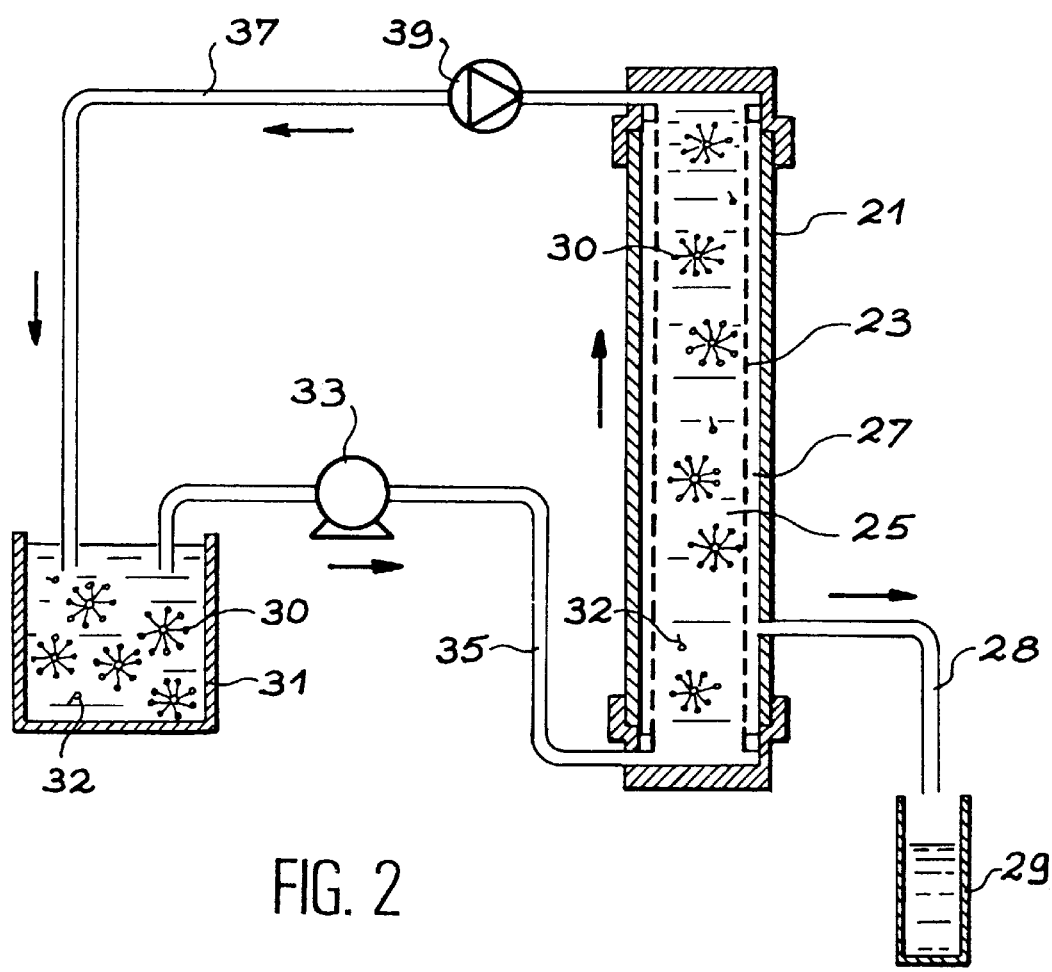
FIG. 2 is a vertical section diagram of a tangential flow micellar ultrafiltration installation.

FIG. 2 gives a diagram of a tangential flow ultrafiltration installation. In this case, the ultrafiltration cell 21 comprises a hollow membrane 23 which borders a retentate compartment 25 and a filtrate or permeate compartment 27 emptied by duct 28 into container 29. The solution comprising micelles 30 and free surfactants 32 is led into ultrafiltration cell 21 from tank 31 via pump 33 and duct 35 which leads to the bottom of the ultrafiltration cell. The retentate exiting the ultrafiltration cell is evacuated via duct 37, fitted with valve gate 39, towards tank 31.

Example 10 below illustrates the use of an installation of this type having the following characteristics:
—volume of solution to be treated: 200 ml
—hollow membrane 27 in Carbosep with a cut-off threshold of 10 000 daltons and a filtering surface of 40 cm² in zirconium/titanium oxide on a carbon support,
—hollow Filtron membrane with a cut-off threshold of 15 000 daltons, on an alumina support with a filtering surface of 75 cm2 in zirconium/titanium oxide,
—an inlet pressure of 0.1 Mpa, and
—a recirculation flow rate of 85 l/h (corresponding to 2.7 m/s for the Carbosep membrane in the presence of a core).

EXAMPLE 10

In this example, a tangential flow ultrafiltration installation is used as in FIG. 2 with a Carbosep-type membrane, to treat an aqueous solution having the following composition:
—Brij 35: $2/10^{-2}$ M
—HS-21: $5.10^{-3}$ M
—NaNO3: 3 M —Th: $2.10^{-3}$ M
—U: $2.10^{-3}$ M
—Ru: $2.10^{-3}$ M As previously, the thorium, uranium and ruthenium were titrated in the filtrate.

The results obtained are given in table 6 below.

When operating in the same manner using the installation with a Filtron membrane of 15 000 daltons instead of the Carbosep membrane of 10 000 daltons, the same results were achieved.

References Cited

[1] Journal of Colloid and Interface science, 163, 1994, pages 81–86.
[2] FR-A-2 619 727
[3] Analytica Chimica Acta, 264, 1992, pages 303–310
[4} Colloids and Surfaces, 63, 1992, pages 291–300.

TABLE I

| Ex | Composition of solution | Metals | 1st Conc 50 ml permeate (mmole/l) | 2nd Conc 50 ml permeate (mmole/l | Conc. Retentate (mmole/l) | Total n° of moles | Yield % (± 0.2) |
|---|---|---|---|---|---|---|---|
| 1 | Triton $2.10^{-2}$ M<br>HS-21 $10^{-2}$ M<br>NaNO$_3$ 3M<br>Th $2.10^{-3}$ M | Th | $2.32\ 10^{-3}$ | $1.74\ 10^{-3}$ | 4.2 | $4.2\ 10^{-4}$ | 99.9 |
| 2 | Triton $10^{-2}$ M<br>HS-21 $10^{-2}$ M<br>NaNO$_3$ 3M<br>U $6.10^{-4}$ M | U | $4.38\ 10^{-3}$ | $2.9\ 10^{-2}$ | 1.17 | $1.19\ 10^{-4}$ | 97.2 |
| 3 | Triton $2.10^{-2}$ M<br>HS-21 $2.10^{-2}$ M<br>NaNO$_3$ 3M<br>Th $4.10^{-4}$ M<br>U $4.10^{-4}$ M<br>Ru $4.10^{-4}$ M | Th | $2.48\ 10^{-3}$ | | $7.9\ 10^{-1}$ | $7.92\ 10^{-5}$ | 99.4 |
|   |   | U | $3.2\ 10^{-3}$ | | $8.3\ 10^{-1}$ | $8.33\ 10^{-5}$ | 99.2 |
|   |   | Ru | $4.05\ 10^{-3}$ | | $8.1\ 10^{-1}$ | $8.14\ 10^{-5}$ | 99.0 |

TABLE 2

| Ex | Composition of solution | Metals | Concentration in filtrate (mmole/l) | Extraction yield (%) (± 0.2) |
|---|---|---|---|---|
| 4 | Triton $2.10^{-2}$ M<br>HS-21 $10^{-2}$ M<br>NaNO$_3$ 3M<br>Th $4.10^{-4}$ M<br>U $4.10^{-4}$<br>Ru $4.10^{-4}$ | Th | $1.95\ 10^{-3}$ | 99.5 |
|   |   | U | $2.05\ 10^{-3}$ | 99.5 |
|   |   | Ru | $2.45\ 10^{-3}$ | 99.4 |

TABLE 3

| Ex | Composition of solution | Metals | 1st Conc 50 ml permeate (mmole/l) | 2nd Conc 50 ml permeate (mmole/l | Conc. Retentate (mmole/l) | Total n° of moles | Yield % (± 0.2) |
|---|---|---|---|---|---|---|---|
| 5 | Brij 35 $2.10^{-2}$ M<br>HS-21 $5.10^{-3}$ M<br>NaNO$_3$ 3M<br>Th $2.10^{-3}$ M | Th | $2.15\ 10^{-3}$ | | 4.2 | $4.19\ 10^{-4}$ | 99.9 |
| 6 | Brij 35 $2.10^{-2}$ M<br>HS-21 $5.10^{-3}$ M<br>NaNO$_3$ 3M<br>U $2.10^{-3}$ M | U | $8.72\ 10^{-3}$ | $6.9\ 10^{-3}$ | 3.95 | $3.95\ 10^{-4}$ | 99.6 |
| 7 | Brij 35 $2.10^{-2}$ M<br>HS-21 $5.10^{-3}$ M<br>NaNO$_3$ 3M<br>Th $2.10^{-3}$ M<br>U $2.10^{-3}$ M<br>Ru $2.10^{-3}$ M | Th | $2.9\ 10^{-3}$ | $2.05\ 10^{-3}$ | 4.21 | $4.2\ 10^{-4}$ | 99.9 |
|   |   | U | $1.08\ 10^{-2}$ | $5.2\ 10^{-3}$ | 4.1 | $4.09\ 10^{-4}$ | 99.7 |
|   |   | Ru | $4.4\ 10^{-3}$ | $3.9\ 10^{-3}$ | 3.89 | $3.9\ 10^{-4}$ | 99.8 |

TABLE 4

| Ex | Composition of solution | Metals | Concentration in filtrate (mmole/l) | Extraction yield (%) (± 0.2) |
|---|---|---|---|---|
| 8 | Brij 35 $2.10^{-2}$ M | Th | $2.22 \cdot 10^{-3}$ | 99.9 |
|   | HS-21 $5.10^{-3}$ M |   |   |   |
|   | NaNO$_3$ 3M |   |   |   |
|   | Th $2.10^{-3}$ M | U | $2.32 \cdot 10^{-2}$ | 98.8 |
|   | U $2.10^{-3}$ M |   |   |   |
|   | Ru $2.10^{-3}$ M | Ru | $5.92 \cdot 10^{-3}$ | 99.8 |
| 9 | Brij 35 $2.10^{-2}$ M | Th | $7.5 \cdot 10^{-4}$ | 99.95 |
|   | HS-21 $10^{-2}$ M |   |   |   |
|   | NaNO$_3$ 3M |   |   |   |
|   | Th $2.10^{-3}$ M | U | $1.57 \cdot 10^{-2}$ | 99.2 |
|   | U $2.10^{-3}$ M |   |   |   |
|   | Ru $2.10^{-3}$ M | Ru | $1.17 \cdot 10^{-2}$ | 99.4 |

TABLE 5

| Ex | Composition of solution | Metals | 1$^{st}$ Conc 50 ml permeate (mmole/l) | 2$^{nd}$ Conc 50 ml permeate (mmole/l) | Conc. Retentate (mmole/l) | Total n° of moles | Yield % (± 0.2) |
|---|---|---|---|---|---|---|---|
| 9 | Brij 35 $2.10^{-2}$ M | Th | $9.7 \cdot 10^{-4}$ | $8.5 \cdot 10^{-4}$ | 4.05 | $4.05 \cdot 10^{-4}$ | 99.95 |
|   | HS-21 $5.10^{-3}$ M |   |   |   |   |   |   |
|   | NaNO$_3$ 3M |   |   |   |   |   |   |
|   | Th $2.10^{-3}$ M | U | $2.6 \cdot 10^{-2}$ | $8 \cdot 10^{-3}$ | 3.93 | $3.94 \cdot 10^{-4}$ | 99.2 |
|   | U $2.10^{-3}$ M |   |   |   |   |   |   |
|   | Ru $2.10^{-3}$ M | Ru | $2.7 \cdot 10^{-4}$ | $1.06 \cdot 10^{-2}$ | 4.01 | $4.02 \cdot 10^{-4}$ | 99.1 |

TABLE 6

| % of filtered solution | Membrane 10 000 daltons and 15 000 daltons | | | | | |
|---|---|---|---|---|---|---|
|   | Concentration in filtrate (mmole) | | | Extraction yield (%) (± 0.2) | | |
|   | Th | U | Ru | Th | U | Ru |
| 10–95% (*) | <0.001 | <0.01 | <0.01 | 99.9 | 99.5 | 99.5 |

(*) For these tests, ultrafiltrations were carried out at 10, 20, 30, 40, 50, 60, 70, 80, 90 and 95%. Each filtrate fraction (20 ml) was analyzed. Irrespective of permeate, the quantity of metal was sufficiently low to be below the detection limit of analytical methods.

What is claimed is:

1. Method for separating at least one metal present in an aqueous solution of radioactive waste, which comprises the following stages:
   1) adding to the aqueous solution a complexing anionic surfactant having the formula:

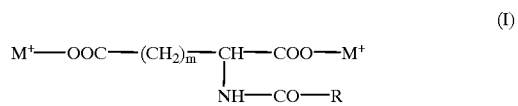

(I)

in which M$^+$ represents a monovalent cation, m=1 or 2, and R represents a linear or branched, saturated or unsaturated aliphatic group of at least eight carbon atoms in sufficient quantity to form micelles containing complexed metal ions in the solution, and
   2) subsequently filtering the aqueous solution through an ultrafiltration membrane able to retain the previously formed micelles.

2. Method in accordance with claim 1, in which, in stage 1), to the aqueous solution is also added a nonionic surfactant to solubilize the anionic surfactant of formula (I) and obtain a stable system.

3. Method in accordance with claim 2, in which the nonionic surfactant is a derivative of polyoxyethylene glycol.

4. Method in accordance with claim 3, in which the nonionic surfactant is the lauryl ether of polyoxyethylene glycol having the formula:

$$CH_3(CH_2)_{11}-(OCH_2CH_2)_l-OH \quad (II)$$

with l=23 on average.

5. Method in accordance with claim 3, in which the nonionic surfactant is a p-(1,1,3,3-tetramethylbutyl)phenoxy polyoxyethylene glycol having the formula:

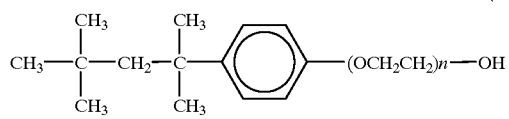

(III)

with n=9.5 on average.

6. Method in accordance with claim 3, in which the anionic surfactant meets formula (I) with R representing the —(CH$_2$)$_{16}$—CH$_2$ group, m equalling 2 and M$^+$ representing Na$^+$.

7. Method in accordance with claim 2, in which the quantity of nonionic surfactant added in stage 1) is such that the concentration of nonionic surfactant in said solution is $5.10^{-3}$ to $4.10^{-2}$ mol/l.

8. Method in accordance with claim 2, in which the anionic surfactant meets formula (I) in which R represents an alkyl group of 10 to 30 carbon atoms.

9. Method in accordance with claim 2, in which the metal or metals to be separated are chosen from among thorium, uranium, ruthenium and the transuranics.

10. Method in accordance with claim 2, in which the quantity of non-ionic surfactant added in stage 1) is such that the concentration of non-ionic surfactant in said solution is $10^{-2}$ to $2 \cdot 10^{-2}$ mol/l.

11. Method in accordance with claim 1, in which the anionic surfactant meets formula (I) in which R represents an alkyl group of 10 to 30 carbon atoms.

12. Method in accordance with claim 1, in which the anionic surfactant meets formula (I) in which R represents the —(CH$_2$)$_{16}$—CH$_3$ group, m equals 2 and M$^+$ represents NA$^+$.

13. Method in accordance with claim 1, in which the aqueous solution comprises from 0 to 3 mol/l of nitrate ions.

14. Method in accordance with claim 1, in which in stage 1) the quantity of anionic surfactant added to the aqueous solution is such that the anionic surfactant concentration of said solution is $4.10^{-4}$ to $5.10^{-2}$ mol/l.

15. Method in accordance with claim 1, in which the cut-off threshold of the ultrafiltration membrane is between 5,000 and 10,000 daltons.

16. Method in accordance with claim 15, in which in stage 2) front flow ultrafiltration of the aqueous solution is carried out, and an ultrafiltration membrane is used having a cut-off threshold of approximately 10,000 daltons.

17. Method in accordance with claim 15, in which in stage 2) tangential flow ultrafiltration of the aqueous solution is carried out, and an ultrafiltration membrane is used having a cut-off threshold of between 10,000 and 15,000 daltons.

18. Method in accordance with claim 1, in which the metal or metals to be separated are chosen from among thorium, uranium, ruthenium and transuranics.

19. Method in accordance with claim 1, in which in stage 1) the quantity of anionic surfactant added to the aqueous solution is such that the anionic surfactant concentration of said solution is $10^{-3}$ to $10^{-2}$ mol/l.

* * * * *

UNITED STATES PATENT AND TRADEMARK OFFICE
CERTIFICATE OF CORRECTION

PATENT NO.   : 6,113,796
DATED        : September 5, 2000
INVENTOR(S)  : Philipe Tounissou et al.

It is certified that error appears in the above-identified patent and that said Letters Patent is hereby corrected as shown below:

Column 1,
Line 47, delete "10 000" and insert -- 10,000 --.

Column 2,
Line 60, delete "phenoxy polyoxyethylene" and insert -- phenoxypolyoxyethylene --.

Column 4,
Line 26, delete "5000 to 30 000" and insert -- 5,000 to 30,000 --.
Line 28, delete "10 000" and insert -- 10,000 --.
Line 31, delete "10 000 to 15 000" and insert -- 10,000 to 15,000 --.

Column 5,
Line 5, delete "10 000" and insert -- 10,000 --.

Column 6,
Line 49, delete "10 000" and insert -- 10, 000 --.
Lines 51, and 52, delete "15 000" and insert -- 15, 000 --.

Column 7,
Line 9, delete "15 000" and insert -- 15,000 --.
Line 10, delete "10 000" and insert -- 10,000 --.

Column 8, table 2,
Line 14, delete "U  $4.10^{-4}$" and insert -- U  $4.10^{-4}$ M --.
Line 15, delete "Ru  $4.10^{-4}$" and insert -- Ru  $4.10^{-4}$ M --.

UNITED STATES PATENT AND TRADEMARK OFFICE
CERTIFICATE OF CORRECTION

PATENT NO.    : 6,113,796
DATED         : September 5, 2000
INVENTOR(S)   : Philipe Tounissou et al.

It is certified that error appears in the above-identified patent and that said Letters Patent is hereby corrected as shown below:

Column 9,
Table 5, delete "8 · $10^{-3}$" and insert -- 8 . $10^{-3}$ --.
Table 5, delete "2 .7 $10^{-4}$" and insert -- 2 . 7 $10^{-2}$ --.
Table 6, delete "10 000 daltons and 15 000 daltons" and insert -- 10,000 daltons and 15,000 daltons --.

Signed and Sealed this

Eighteenth Day of December, 2001

*Attest:*

JAMES E. ROGAN
*Attesting Officer*     *Director of the United States Patent and Trademark Office*